United States Patent [19]

Aurtoi et al.

[11] Patent Number: 5,011,339
[45] Date of Patent: Apr. 30, 1991

[54] PROCESS FOR DISTRIBUTION OF PIECES SUCH AS RIVETS, AND APPARATUS FOR CARRYING OUT THE PROCESS

[75] Inventors: Jean-Marc Aurtoi; Philippe Bornes, both of Flourens, France

[73] Assignee: Ste. Ateliers de la Haute-Garonne-ets Auriol et Cie, Balma, France

[21] Appl. No.: 447,501

[22] Filed: Dec. 7, 1989

[30] Foreign Application Priority Data

Dec. 8, 1988 [FR] France ............................. 88 16292

[51] Int. Cl.$^5$ .................. B65G 53/016; B65G 51/018
[52] U.S. Cl. ..................................... 406/191; 406/86; 406/180; 221/278
[58] Field of Search ................. 406/191, 194, 86, 176, 406/180; 221/278, 233

[56] References Cited

FOREIGN PATENT DOCUMENTS 3148990 6/1983 Fed. Rep. of Germany ...... 221/278
2067149 7/1981 United Kingdom ................ 221/278

Primary Examiner—Joseph F. Peters, Jr.
Assistant Examiner—Linda L. Palomar
Attorney, Agent, or Firm—Harold H. Dutton, Jr.

[57] ABSTRACT

The invention relates to a process for dispensing indentical pieces having a symmetry of revolution about an axis, such as rivets; this process comprises arranging the pieces one after another in a tube (2) which has a hollow center (2a) adapted to assure the guiding thereof, admitting a compressed fluid into the tube behind the last piece (1D), and distributing said fluid along the length of the tube toward the hollow center (2a) thereof, to the interior of one or several longitudinal passageways (2b), such that the fluid pressure is exerted along the hollow cetner in the spaces (E) separating the pieces, up to the first piece (1P) on which the pressure acts for assuring its transfer. The process of the invention permits dispensing a very great number of pieces without risk of jamming in the tube and with a precise guiding permitting maintaining the alignment of the axes of the pieces.

6 Claims, 5 Drawing Sheets

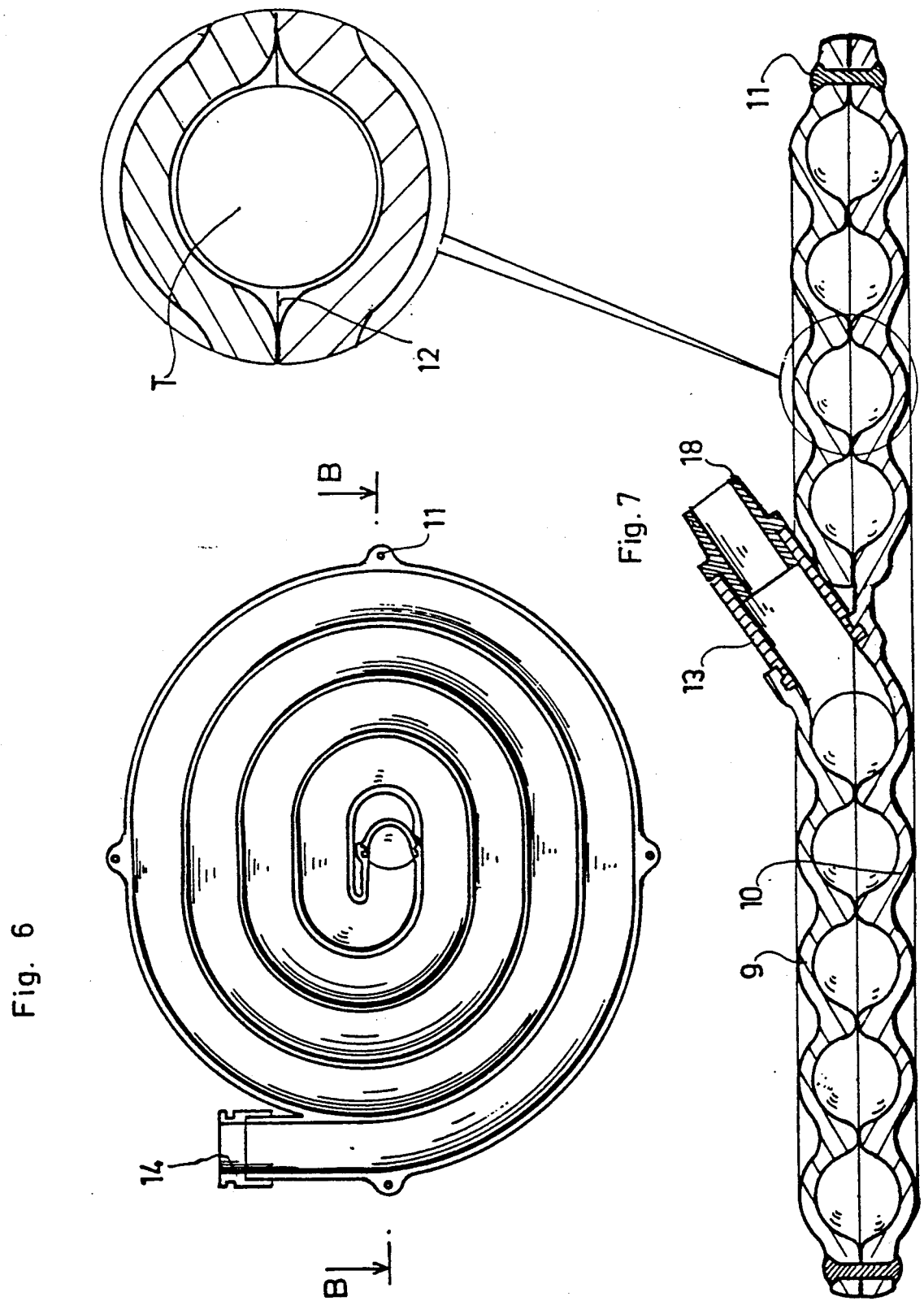

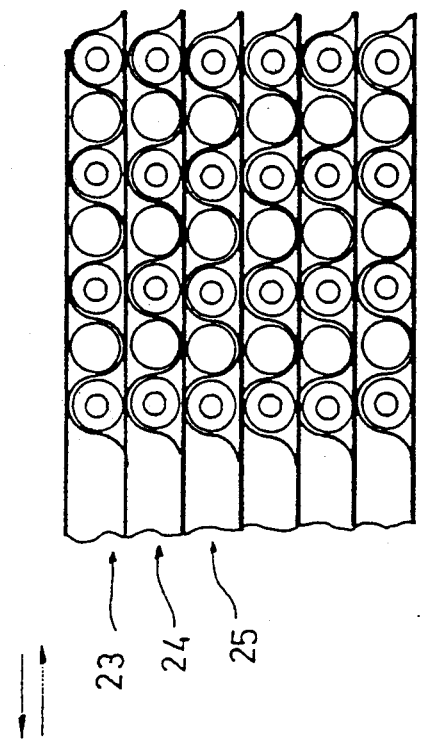
Fig. 8
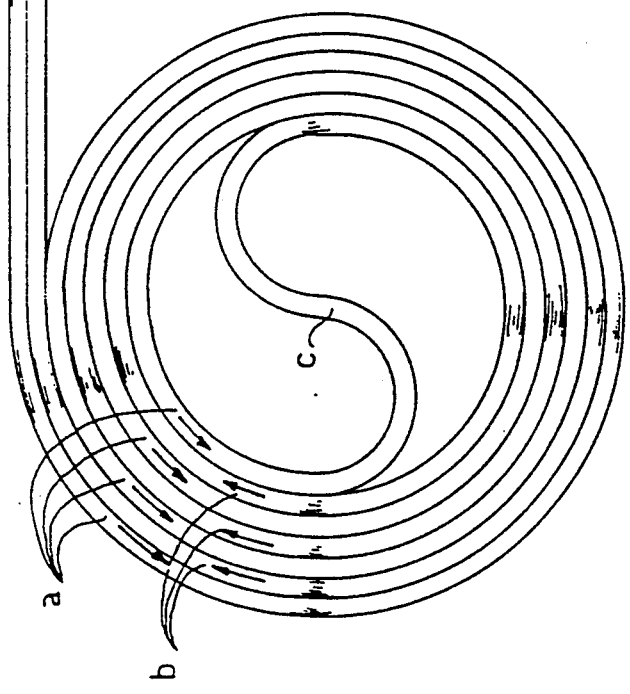
Fig. 9
Fig. 10
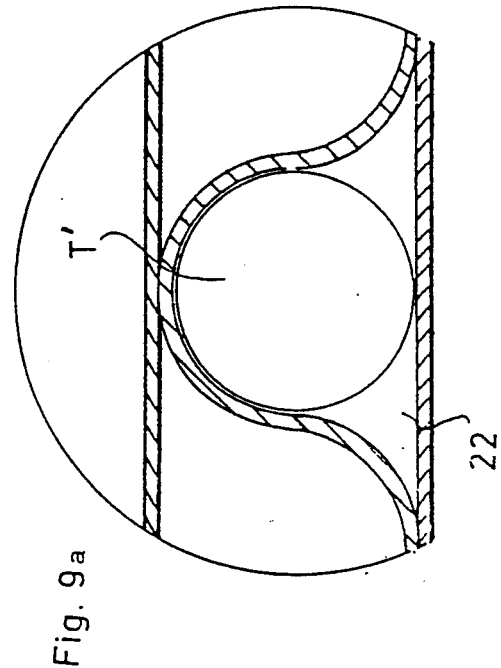
Fig. 9a
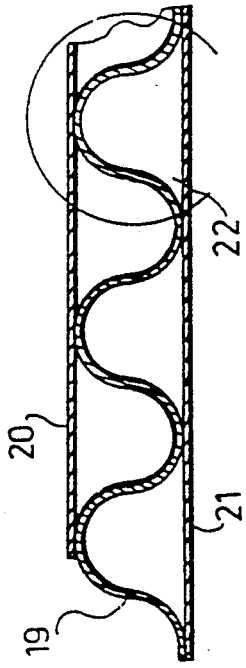

PROCESS FOR DISTRIBUTION OF PIECES SUCH AS RIVETS, AND APPARATUS FOR CARRYING OUT THE PROCESS

This invention relates to a process for distribution of identical pieces having a symmetry of revolution about an axis, such as, for example, rivets. The invention provides for distribution of the pieces in such a manner that the pieces are presented with their axes aligned in a given direction in preparation for their utilization (for example, a riveting operation for rivets). The invention also relates to a distribution apparatus and a device for conditionning the pieces having symmetry of revolution, in order to carry out the aforementioned process. The invention is applicable in any event, where identical pieces having a symmetry of revolution are distributed sequentially with their axis in a predefined direction, in particular the distribution of rivets toward a tool or a riveting machine for achieving an automatic riveting.

BACKGROUND AND OBJECTS OF THE INVENTION

It is well known to transfer rivets in tubes with the help of compressed air. The rivets are arranged in a column in the tube which guides them and the compressed air is admitted at one end thereof in order to displace the entire column and thus bring about the expulsion of the rivets, one after another, at the other end of the tube. The essential advantages of such a system reside in the simplicity and in the fact that it permits a distribution of each rivet in a defined position, ready for feeding to an automatic machine.

However, this transfer process only gives satisfactory results if the rivets are in very small numbers in the tube. In effect, when this number increases beyond several units, a blocking of the assembly develops, due to the cumulative effects of mechanical and pneumatic jamming of each rivet in the tube, each rivet functioning as a piston in a cylinder. This phenomenon results regardless of the pneumatic pressure used, because if a rise in the pressure increases the pressure on the column of rivets, it also increases equally the effect of jamming of each rivet, such that a rise in pressure, even substantial, does not permit in practice significantly increasing the number of rivets which may be arranged in the distribution tube. As a result, such a process of distribution is actually useable for transferring rivets to the unit or in a small number from one point to another, but not for permitting distribution of the rivets from a tube in which they will be initially arranged in large numbers. This limitation has practial capital consequences: the actual process is not compatible with a storage of rivets in great numbers in the distribution tube and assumes a feeding from the inlet in proportion to the transfer (the initial distribution means then are provided upstream of the tube). Under these conditions, the process of pneumatic transfer through tubes which is actually known resolves the problem of transporting the rivets from one point to another, (or more generally pieces with a symmetry of revolution about an axis) but not the problem of their storage and sequential distribution at the point of use.

British patent 2,067,149 and German patent 3,148,990 describe a pneumatic distribution process for screws of a particular type ("self-piercing nuts"), but the process is limited to this specific type of piece.

The present invention proposes to remedy the limitations of known processes for distribution of rivets, or more generally, distribution of pieces having a symmetry of revolution about an axis, in order to present each piece with its axis aligned in a given direction.

An essential object of the invention is to permit causing the circulation of a very large number of these types of pieces (theoretically without limit) for bringing them to be presented one by one, with their axis in an appropriate position at the inlet of a tool or a machine where they are to be used, for example a riveting machine in the case of rivets.

Another object is to resolve the problem of storage of said pieces, while permitting the distribution tube to function as the conditioning tube therefor.

Another object associated with the preceding one is to permit an improvement of the homogeneity of the pieces distributed due to a great security of storage (complete absence of manipulation by hand on the stored lot from the storage operation to the piece distribution operation).

DESCRIPTION OF THE INVENTION

To this end, the process provided by the invention for the distribution of identical pieces having a symmetry of revolution about an axis, for example rivets, comprises using a tube having a hollow core of a shape adapted to the transverse cross-section of a greater diameter than the pieces to be able to assure a peripheral guiding of the pieces at the level of this section, arranging the pieces one after another on the interior of the tube with their axes of revolution extending along the longitudinal axis of the tube and feeding said tube with a compressed fluid for assuring the transfer of the pieces toward an open, distribution extremity of said tube. According to the present invention, the compressed fluid is admitted into the tube behind the last piece and is distributed along the length of the tube at the interior of at least one longitudinal passageway provided on the internal surface of said tube for opening into the hollow core thereof, such that the fluid pressure is exerted all along the hollow core in the spaces separating said pieces, up to the first piece on which the pressure acts for assuring the transfer toward the distribution extremity.

By the term "longitudinal passageway" is meant any hollow shape, regardless of the cross-sectional shape, extending along the wall of the tube, this passageway being able to be linear, helical, etc.

The known pneumatic transfer process for rivets comprises exerting a pneumatic pressure on the last piece of the stack (that is the one piece which is situated the farthest upstream, at the tube inlet), this pressure being mechanically transmitted from point to point from the upstream or inlet end downstream toward the first piece (situated downstream, at the distribution end) with respect to the pieces, one against the other. By contrast, in the process of the invention, the pressure is distributed to the interior of the one or more passageways along the tube such that the intermediate pieces are under equal pressure, just as their cross-section of greatest diameter, guided by the tube, works as a piston which, in the absence of the passageway, would oppose the equal pressure. Thus there is achieved a precise guiding of the pieces permitting keeping their axes in alignment in the tube, while avoiding the intermediate pieces being subjected to a forces causing jamming, the pressure coming to be exerted directly on the first piece which is situated opposite the open distribution extremity. This first piece is displaced toward the distributing end until expelled from the tube with its axis in alignment therewith, so that one by one, while moving from the upstream to the downstream direction, the pieces are displaced under the effect of the transitory pressure differences to which they are successively subjected after displacement of the first piece. The transfer and expulsion are thus produced directly by the compressed fluid (and not by the mechanical forces), and the cumulative effects of jamming, as in conventional processes, are completely eliminated. Under these conditions, the number of pieces stackable in the tube is without limit.

Because of the significant capacity which the tube may have, it is possible to preliminarily condition or orient the pieces in the tube with stop members which will be placed at its extremities, immediately after the conditioning operation. Such a process assures that a foreign piece will not be mixed in the thus stored assemblage. Before assuring the distribution, it will suffice to withdraw the stop member situated at the distribution end and to direct the pressurized fluid to the other end.

The process of the invention is particularly applicable for achieving the storage and distribution of selected rivets in a predetermined range of tolerances. Such a process may carry considerable advantages in the riveting field. In effect, the fabrication of rivets being assured in a conventional manner with usual tolerances, it is possible by a preliminary selection to separate these rivets into several lots, each corresponding to a range of tolerances much narrower than those of the initial assembly (Gaussian curves with a narrow base): after selection, each lot is conditioned according to the invention in order to assure that no foreign element will be mixed with the lot. At the place of distribution, the storage tube is directly branched to the riveting machine, which is initially adapted to the rivets concerned (diameter of the boring tool, backing plate, etc.) Thus, a much higher quality of riveting is obtained than that obtained with conventional tolerances (second head of invariable volume, axial constraints on the most precise sheets of metal, preformed head cooperating in a more precise manner with the backup plates, etc.) and in particular, disadvantageous stoppages as heretofore produced by jamming of the rivets, due to poor homogeneity, are suppressed on the riveting machine.

The invention also relates to a distribution apparatus for identical pieces, comprising a tube with a hollow core, characterized in that at least one longitudinal passageway is provided on the internal surface of said tube in such a manner as to open into the hollow core along the length thereof.

The invention relates as well to such an apparatus making use of means for conditioning the pieces and comprises stop members situated at the extremities of the tube for retaining the pieces.

DESCRIPTION OF THE DRAWINGS

Other characteristics, objects and advantages of the invention will become apparent from the description which follows in reference to the accompanying drawings, which show by way of non-limiting examples, various embodiments thereof. In these drawings:

FIGS. 6 and 7 show another embodiment, respectively in plan view and in cross-section along lines BB of FIG. 6;

FIGS. 8 and 9 show another embodiment, respectively in plan and in partial cross-section;

FIG. 10 shows, in partial cross section, an embodiment with several superimposed tubes;

DETAILED DESCRIPTION OF PREFERRED EMBODIMENTS

Figure 1:
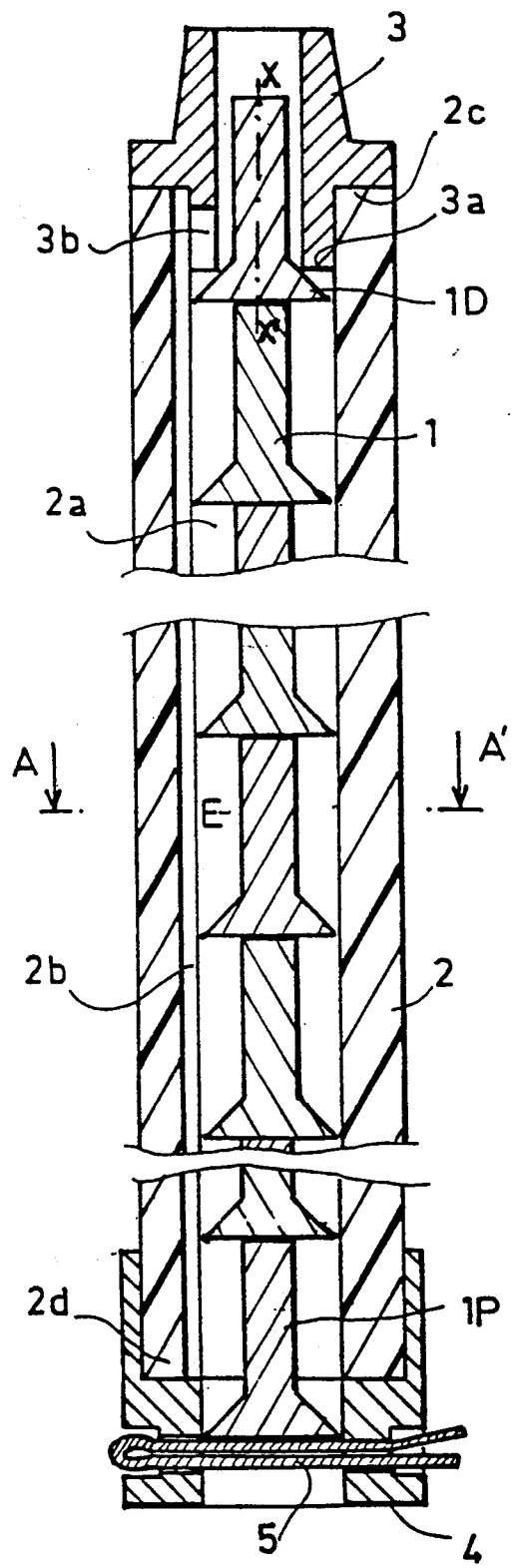
FIG. 1 is an axial cross-sectional view, on an enlarged scale, of an apparatus for conditioning and distributing rivets according to the invention.
Figure 2:
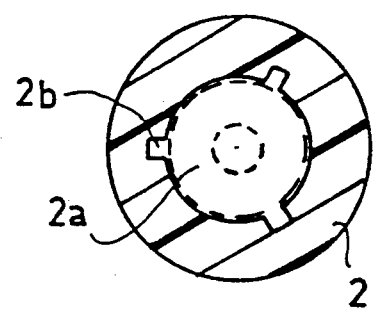
FIG. 2 is a transverse sectional view along lines AA' of FIG. 1 and viewed in the direction of the arrows.

The apparatus shown by way of example in FIGS. 1 and 2 is intended to permit the orienting or conditioning and distribution of a large number of identical pieces having a symmetry of revolution about an axis XX', such as rivets 1.

This apparatus comprises a cylindrical tube 2 having a hollow central core 2a of a cylindrical form, the diameter of which corresponds to that of the largest cross-section of the rivets to be distributed (the head of the rivet) in such a manner as to contain the rivets and to guide them on their periphery with a play of several tenths of a millimeter at the level of this greatest section. The tube 1 may be rigid, semi-rigid or flexible. According to the needs of the particular application, it may be provided rectilinearly or of a different shape (notably rolled up in a coil as will be seen below in order to reduce the bulk of the assembly).

The length of this tube is adapted to the number of pieces to be conditioned. This number may be very high, and tests have been carried out with tubes of a length of 33 m, containing 3300 rivets, without leading to any difficulty in the transfer or distribution.

On the internal surface of the tube 2 are arranged three passageways such as 2b, angularly arranged at 120°, and which extend along the length of the tube. Each of these passageways opens into the hollow center 2a of the tube along the length thereof.

At one end of the tube (inlet 2c), is secured, particularly by bonding, a stop member comprising a connecting ferrule 3 leading to a compressed air conduit. This member forms in the hollow center a stop shoulder 3a of the last rivet 1D and is shaped to permit the passage of compressed air (baffles 3b at right angles with the passageways).

At the other end of the tube (distribution end 2d) is secured, as by bonding, a ferrule 4 which carries a removable cotter pin 5 retaining the first rivet 1P of the stack. This ferrule 4 is shaped to be able to cooperate with a tool or a riveting machine of a given type.

The rivets are conditioned and oriented in the described apparatus immediately after a sorting operation which permits selecting the rivets in a predetermined range of tolerances (narrower than in the case of the conditioning in bulk as currently used, in which the tolerances are those of the standard of production). The conditioning apparatus according to the invention is only opened by withdrawal of the cotter pin 5 at the moment of mounting it on the riveting machine, such that no foreign piece may accidentally be mixed in the lot. The characteristics of the lot concerned will be indicated on the tube. It will be understood that to avoid inlet of powder into the tube, the ferrules 3 and 4 may be closed by any appropriate means (removable plug, removable film wrapping the assembly, . . . ). When put into place, the rivets are arranged one after another with their axes extending along the axis of the tube.

Figure 3A:
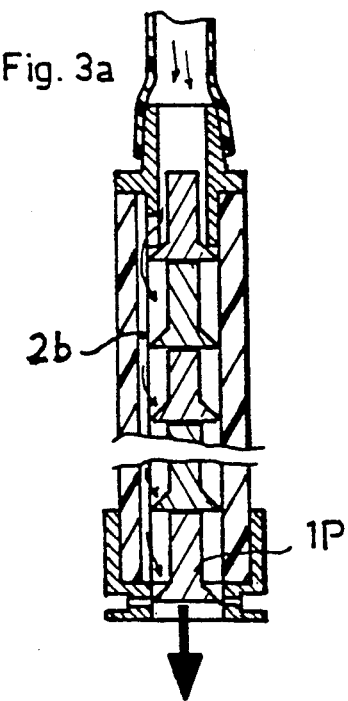
FIGS. 3a, 3b and 3c are partial cross-sectional schematic views showing the distribution process carried out by means of said apparatus.

The distribution of the rivets from the apparatus described above will be carried out by withdrawing the cotter pin 5 and by connecting the connecting ferrule 3 to a source of compressed air (FIG. 3a). The compressed air pressure is exerted on the last rivet 1D, but when the number of rivets exceeds about ten or twenty, the effects of jamming on the column prevent any displacement thereof. In the invention, the compressed air is distributed by the grooves 2b along the length of the tube and the pressure is established in the separating spaces E between the rivets. Under these conditions, the column is no longer subject to a thrusting action leading to jamming, and the fluid exerts its action directly on the first rivet 1P. This rivet is forced toward the end 2d through which it is dispensed. In the example shown, the grooves 2b are closed at the distribution end 2d for emptying solely into the hollow core at the rear of the first piece 1P. However, one or several grooves 2b may empty freely to the exterior at the distribution end without being harmful to the operation. Because of the presence of the head of the rivets, the pneumatic action on the first piece is then accentuated by an aspiration effect.

Figure 3B:
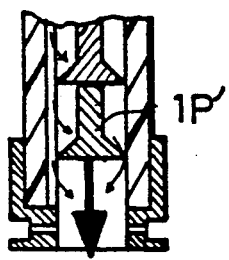

After discharge of the rivet 1P, the following rivet 1P' (FIG. 3b) becomes the first in the column and is subjected itself to the pressure of the fluid (in addition to the aspiration effect mentioned). This rivet is displaces toward the distribution end through which it is dispensed.

Figure 3C:
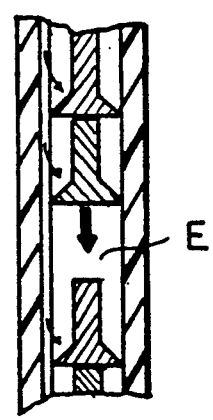

It is convenient to note that when a rivet is displaced in the column (FIG. 3c), it creates a depression in the space E which separates it from the following rievt, such that the latter is subjected to a pneumatic force tending to cause it to advance in the tube. The column is then shifter progressively toward the dispensing end in proportion to the dispensing of rivets situated opposite this end, and this, with a precise guiding of each rivet at its head.

This distribution process permits arranging a very great number of rivets in the tube, since the transfer and dispensing, which are caused by a direct pneumatic effect on the first rivet, are independent of the number of rivets situated upstream thereof.

The longitudinal grooves or passageways which permit the air pressure to be established all along the length of the tube may be of any cross-section and produced by any process (molding, extrusion, machining, etc). They may be linear (that is, parallel to the axis of the tube) or they may be helical or any other shape. (By "longitudinal groove or passageway" is meant a passageway extending in the direction of the length of the tube.)

Figure 4:
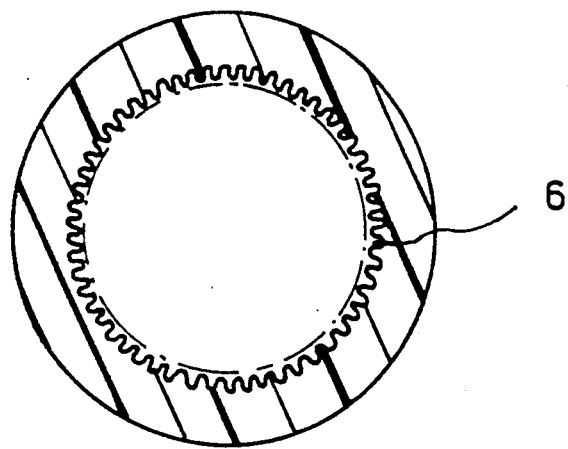
FIG. 4 is a transverse sectional view of another embodiment.

By way of example, FIG. 4 shows in cross-section another type of tube in which the grooves are formed by a plurality of grooves which are arranged on the internal face of the tube around its hollow center.

Figure 5:
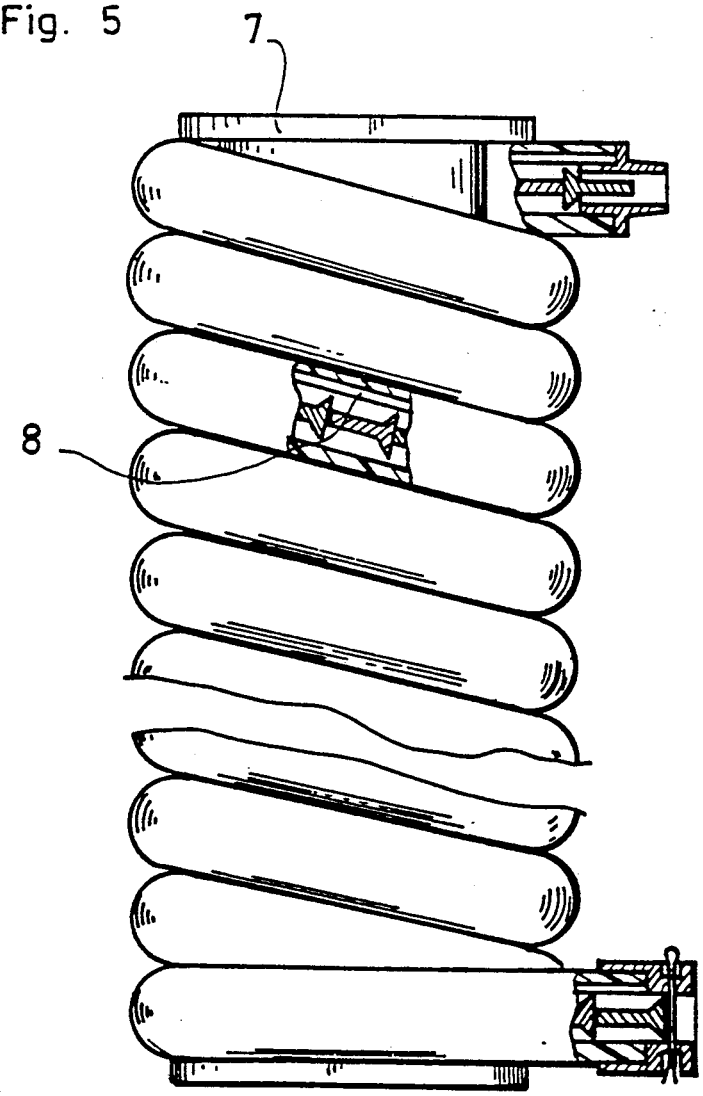
FIG. 5 is a schematic assembly view, with portions broken away for clarity, of a conditioning apparatus arranged in the shape of a coil.

FIG. 5 shows an apparatus for orientation and distribution of the type described previously, produced by means of a flexible tube which is rolled about a form of a bobbin around a cylindrical support 7. It is understood that the radius of curvature of the coils is provided sufficiently great with respect to the diameter of the tube to permit a sliding of the rivets without difficulty. The grooves 8 for the pressure distribution along the tube are analogous to those heretofore described.

FIGS. 6 and 7 show another embodiment in which the guide tube for the rivets is rolled in helical form on a form of a disk and is formed by two half-shells 9 and 10 which are fastened one to the other, for example by means of rivets 11. Each half-shell is molded to form a hald of the section of the tube. The grooves for distributing the pressure are formed by the passages 12 coming from the mold, situated at the level of the joints between the half-shells. In the detail view of FIG. 7, a head of a rivet T guided on its periphery in the tube of the apparatus is shown, with the grooves 12 for establishing the pressure along the length of the tube. The inlet to the tube, which is caused to be connected to the compersesd air source, may be formed by connecting pieces 13 and 18, the piece 13 being inserted between the two shells at the moment of their joining. The dispensing end may be provided as before with a bonded ferrule 14.

FIGS. 8 and 9 show another embodiment in which the guide tube for the rivetrs is rolled in a double helix, advancing -a- and return -b-, with a central connection -c- between the advance and return. The tube is shown in the form of a disk formed with an undulating wall 19 and two plates 20 and 21 secured on opposite sides of the wall, for example by bonding to the peaks of the undulations. The pressure distributing grooves 22 are situated at the level of the joints between the corrugated wall and the plates. In the detail of FIG. 9, a head of a rivet T' is shown, guided on its periphery with the grooves 22 for establishing the pressure along the tube.

FIG. 10 shows an apparatus with several tubes in the form of superimposed disks of the preceeding type 23, 24, 25 . . . Such an apparatus permits orienting and distributing a very large number of rivets, with reduced bulk.

Figure 11:
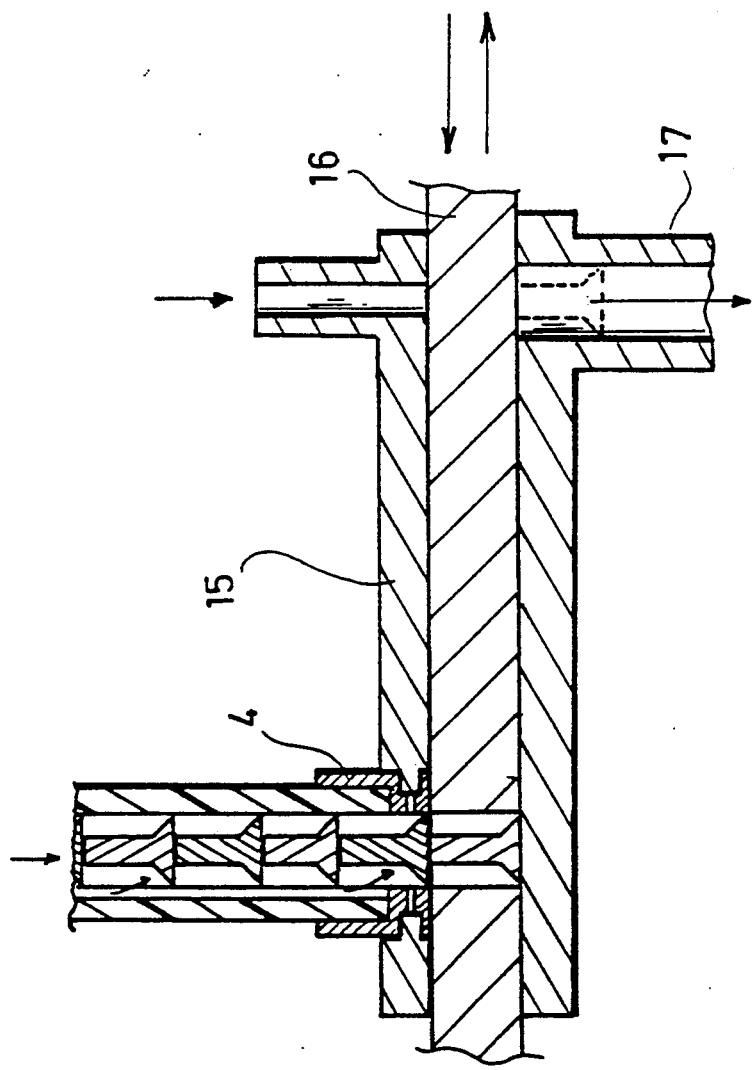
FIG. 11 is a schematic view of an apparatus according to the invention, mounted on the head of a machine for working on the distributed pieces.

Further, by way of illustration, FIG. 11 shows the dispensing end of an apparatus according to the invention, associated with a head of a riveter which receives a distribution of rivets, one by one, toward the riveting means. In the example, the ferrule 4 of the device is fixed on a plate 15 of the riveter and a movable slide 16 receives each rivet at the outlet of the dispensing tube for transfering it to a tube 17 for feeding a riveting means.

While this invention has been described as having certain preferred features and embodiments, it will be understood that it is capable of still further variation and modification without departing from the spirit of the invention, and this application is intended to cover any and all variations, modifications and adaptations which fall within the spirit of the invention and the scope of the appended claims.

What is claimed is:

1. A process for dispensing identical pieces having a symmetry of revolution about an axis, comprising: providing a tube (2) having a hollow center (2a) and a shape corresponding to the transverse section of the greatest diameter of the pieces for assuring a peripheral guiding of said pieces at the level of this section, arranging the pieces one after another in the interior of the tube (2) with their axes of revolution extending along the longitudinal axis of said tube and feeding one end of said tube with a compressed fluid for assuring the transfer of the pieces toward an open dispensing end (2d) of said tube, admitting the compressed fluid into the one end of the tube behind the piece closest to said one end of the tube and distributing the fluid along the length of the tube through at least one longitudinal passageway (2b) on the internal surface of said tube and opening into the hollow center (2a) thereof for exerting the pressure of the fluid along the hollow center in the spaces (E) between the pieces, to the piece (1P) closest to the dispensing end on which said pressure acts for assuring the transfer toward the dispensing end (2d).

2. A process as in claim 1, and including distributing the compressed fluid along the interior of a plurality of linear grooves (2b) arranged about the hollow center (2a).

3. A process as in claim 1, and including admitting the compressed fluid into the hollow center through said one end of the tube by means of one or more grooves opening freely to the exterior of the dispensing end.

4. A process as in claim 3, and including admitting the compressed fluid into the hollow center of the tube through said one end of the tube (2d), and wherein at least one of said grooves (2b) is closed at the dispensing end for emptying only into the hollow center behind the piece closest to the dispensing end.

5. A process as in claim 1, for dispensing rivets and including sorting the rivets by size according to a predetermined range of tolerances.

6. A process as in claim 1 and including preliminarily orienting the pieces (1) in the tube (2) with stop members (3, 4) provided at the ends of the tube, and withdrawing the stop member (4) situated at the dispensing end for assuring the dispensing.

* * * * *